(12) United States Patent
Wessel et al.

(10) Patent No.: US 6,216,553 B1
(45) Date of Patent: Apr. 17, 2001

(54) SELECTOR FOR A BICYCLE GEAR MECHANISM

(75) Inventors: Robert Wessel; Markus Arbeiter, both of Würzburg; Bernhard Johanni, Oberwerrn, all of (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 09/205,789

(22) Filed: Dec. 4, 1998

(30) Foreign Application Priority Data

Dec. 5, 1997 (DE) .............................................. 197 53 901

(51) Int. Cl.[7] ...................................................... F16C 1/18
(52) U.S. Cl. ............................................ 74/502.2; 74/489
(58) Field of Search ......................... 74/488, 489, 501.6, 74/502.2

(56) References Cited

U.S. PATENT DOCUMENTS

| | | | |
|---|---|---|---|
| 4,938,733 | * 7/1990 | Patterson | 74/488 |
| 5,438,889 | * 8/1995 | Tagawa | 74/473.14 |
| 5,476,019 | * 12/1995 | Cheever et al. | 74/489 |
| 5,588,331 | * 12/1996 | Huang et al. | 74/502.2 |
| 5,662,000 | * 9/1997 | Patterson et al. | 74/489 |
| 5,666,858 | * 9/1997 | Von Der Osten-Sacken et al. | 74/489 |
| 5,673,594 | * 10/1997 | Huang et al. | 74/489 |
| 5,676,020 | * 10/1997 | Jordan et al. | 74/502.2 |
| 5,787,757 | * 8/1998 | Ozaki | 74/502.2 |
| 5,797,296 | * 8/1998 | Ozaki | 74/502.2 |
| 5,829,313 | * 11/1998 | Shahana | 74/502.2 |
| 5,957,002 | * 9/1999 | Ueng | 74/489 |
| 5,970,816 | * 10/1999 | Savard | 74/502.2 |
| 6,042,133 | * 3/2000 | Leiter et al. | 74/489 |

* cited by examiner

*Primary Examiner*—David A. Bucci
*Assistant Examiner*—Chong H. Kim
(74) *Attorney, Agent, or Firm*—Cohen, Pontani, Lieberman & Pavane

(57) ABSTRACT

A selector for a bicycle gear mechanism. The selector has a housing fastened to a portion of a bicycle frame, a cable inlet, and a rotatable drum having a control cable wound onto for effecting cable travel. The selector also includes a rotary bushing for operating the selector and a mechanism for superimposing a correction or overshift travel on the cable travel. The mechanism includes a pivoting lever for guiding the control cable and a correction cam having a profile configured to provide the requisite correction travel for each gear stage as the rotatable drum is rotated.

10 Claims, 4 Drawing Sheets

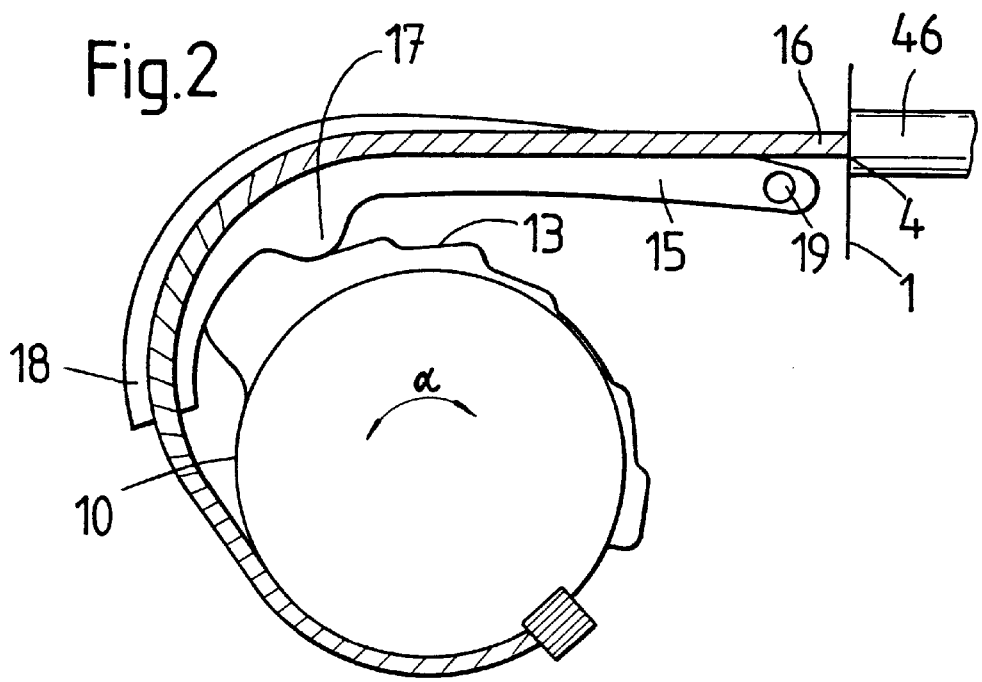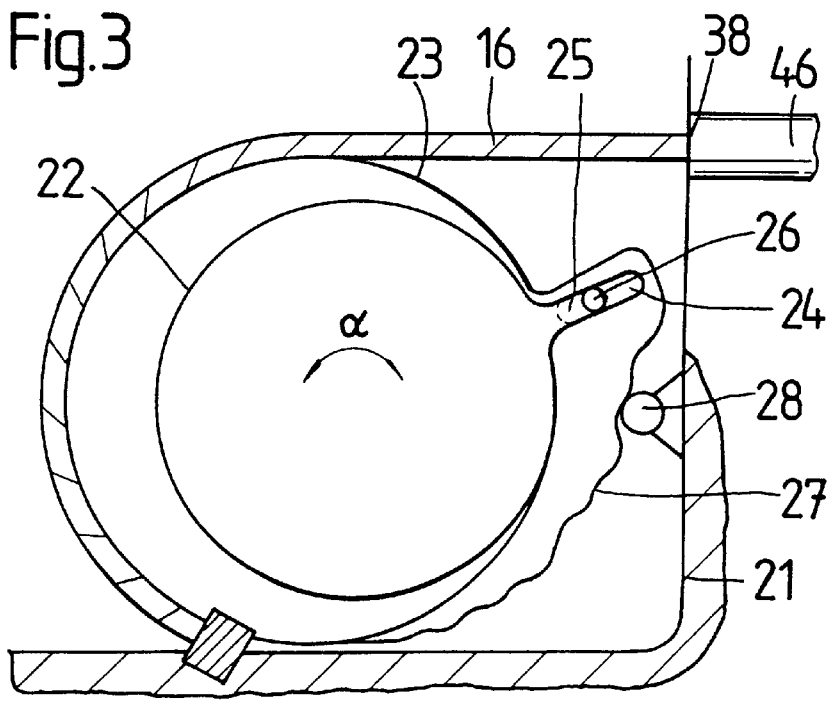

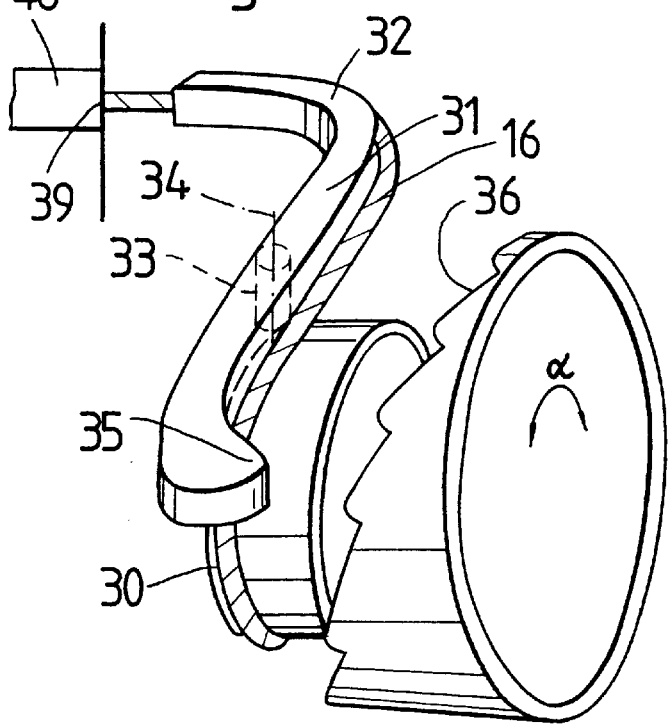
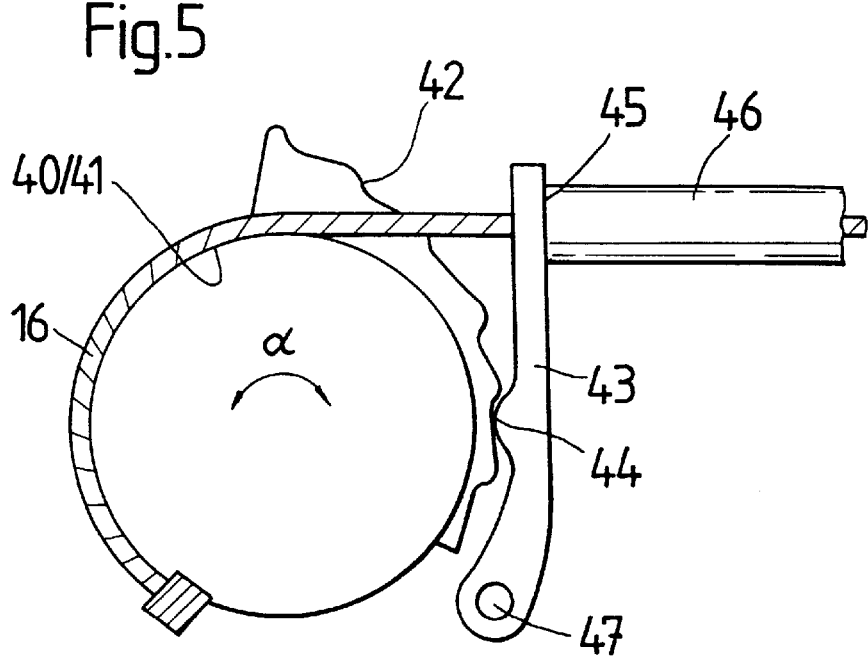

SELECTOR FOR A BICYCLE GEAR MECHANISM

BACKGROUND OF THE INVENTION

1. Field of the Invention

The present invention relates to selectors for actuating bicycle gear mechanisms including hub gears or derailleur gears.

2. Description of the Related Art

EP-0 686 552 A2 discloses a rotatable grip for actuating bicycle gear shifts, in which the conversion of the rotational movement of the grip into a longitudinal movement of a control means is carried out in such a way that the control means is fastened to the grip, deflected in a helical manner about the bicycle handlebar or a sleeve encasing the handlebar, and guided in a longitudinal guide that is stationary in relation to the bicycle handlebar, at a sufficiently great distance, in the rotational direction of the grip, from the fastening of the control means to the grip. This means that the travel of the fastening point of the control means that is covered when the grip is rotated along a circular path is considerably greater than the travel of the control means in its longitudinal guide. The result is thus favorable conversion of wide angles of rotation at the grip into small longitudinal movements of the control means. The grip is fixed in the positions for the respective gear stages of the bicycle gear shift by a detent so that it is possible to vary the holding force and the necessary actuating force of the detent.

The above-mentioned rotary shift grip has a detent which must be oriented to the predefinitions in the respective gear mechanism of the bicycle. This condition leads to the situation in which different shift travels may result in the various gears, and individual gears may lie closer together and other gears may lie further apart from one another. Where the gears lie closely adjacent one another, shift stages may be skipped inadvertently if the rider does not pay close attention to shifting.

SUMMARY OF THE INVENTION

It is therefore an object of the present invention to provide an ergonomic selector which is easy to use and simple to manufacture.

Another object of the present invention is to provide a selector having approximately equally large shift travels, whose angles of rotation have a specific magnitude.

Still another object of the invention is to provide a selector having a mechanism which, on the one hand, permits correction of the total shift travel and/or the individual shift travels for the gear stages, while on the other hand, permits overshift travels of any magnitude for the individual gear stages.

In a presently preferred embodiment of the present invention, the selector not only produces approximately identical shifting steps, but it is also possible for the total shift travel to be varied if the pulling-in of the cable which is produced by winding the control cable onto the drum does not correspond to ergonomic requirements. It is therefore possible to achieve a step-up or step-down between the pull-in of the cable, on the one hand, and the movement of the actuating elements, on the other.

That is not the whole story, however: the design of the selector proposed in the present invention also permits an overshift travel to be produced for each gear stage or for all gear stages, which is particularly desired when shifting the chain from a respectively smaller to a larger sprocket. This means that, during shifting, the derailleur is briefly shifted somewhat further than necessary, in order to make it easier for the chain to "climb" upward. The proposed selector permits an individual overshift travel for each gear stage, if this is necessary, and permits operation which fixes the respective position of the gear stages without a reverse rotational movement of the actuating elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 2 illustrates a correction cam in cooperation with a pivoting lever of the embodiment of FIG. 1;

FIG. 3 schematically depicts another embodiment of the selector having a stationary cam and a correction cam;

FIG. 4 shows another embodiment of the selector having a rotatable drum and a correction cam engageable in the axial direction;

FIG. 5 shows another embodiment of the selector having a pivoting lever for varying the position of a cable inlet with respect to the rotatable drum;

DETAILED DESCRIPTION OF THE PRESENTLY PREFERRED EMBODIMENTS

Figure 1:
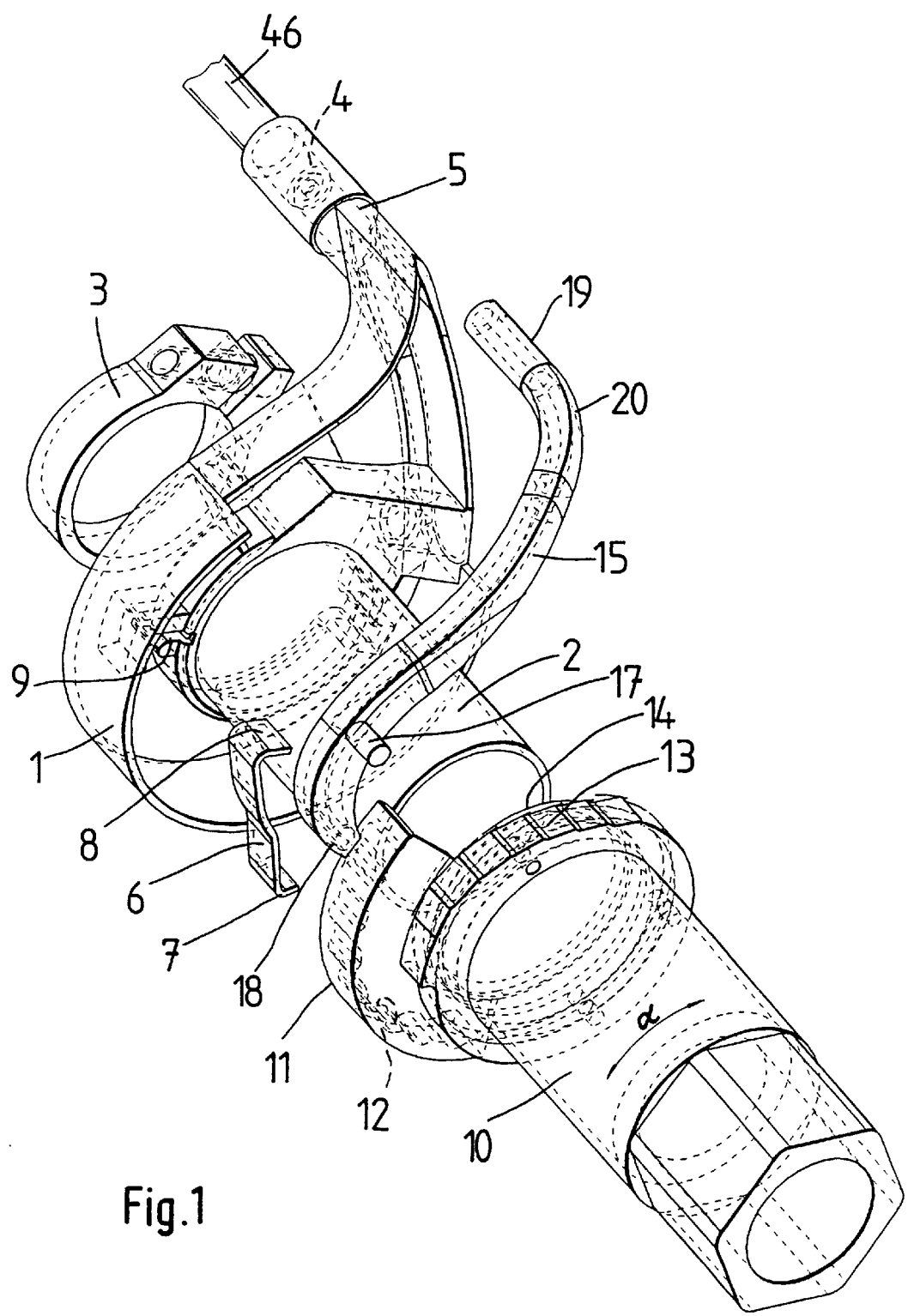
FIG. 1 is an exploded view of an embodiment of a selector constructed in accordance with the present invention.

Referring now to the drawings, FIGS. 1 and 2 illustrate an embodiment of a selector constructed in accordance with the present invention. In this embodiment, the selector is configured as a rotary grip selector. The selector comprises a housing 1 and a guide tube 2 for mounting a rotary bushing 10. The selector can be fastened to one end of the handlebar of the bicycle with a clamp 3. In order to guide a control cable 16 from a control cable jacket 46 into the housing 1, a cable inlet 4 for passing a cable into the selector is arranged at that part of the housing which is most remote from the handlebar. As illustrated, a bearing member 5 is dimensioned to connect substantially coaxially with the cable inlet 4 at one end and a bearing end 19 of a pivoting lever 15 at another end so as to pivotally support the pivoting lever 15. A spring 6 has a hook portion 7 configured to engage and cooperate, at a joint location 9 in the housing 1, with shift detents 12 in a rotary element 11, while a dome portion 8 of the spring 6 is maintained under prestress. The rotary element 11 is connected to the rotary bushing 10 which, for its part, has a correction cam 13 which cooperates with a pivoting cam 17 arranged on the pivoting lever 15. The pivoting lever 15 has a first cable deflection radius 18, which at the end of the pivoting lever 15 curves toward a rotatable drum 14 so that the control cable 16, which is guided along a depression or groove defined in the pivoting lever 15, is led tangentially toward the circumferential wall of the drum 14. The pivoting lever 15 also has a second cable deflection radius 20 deflects the depression in the pivoting lever 15 toward the bearing member 5 or toward the cable inlet 4 so that the control cable 16, after exiting the control cable jacket 46, receives practically complete guidance toward the drum 14 within the housing 1.

The operation of the selector will be described with reference to a rotary grip selector. When a bicycle rider rotates the rotary bushing 10 to shift gear, the rotary element 11 together with the shift detents 12 rotates with the rotary bushing 10 past the dome portion 8 of the spring 6, so that the drum 14 connected to the rotary element 10 can wind or unwind the control cable 16. In this manner, the bicycle rider can clearly feel the shift detents 12 sliding past the dome portion 8 of the spring 6. The control cable 16 runs along the depression in the pivoting lever 15, concentrically through the bearing end 19 and the cable inlet 4, and into the control cable jacket 46. The control cable 16 is connected by way of the other end to the gear mechanism of the bicycle, where a tension spring provides appropriate tension to the control cable 16.

In order to achieve substantially identical angles of rotation 51 for each gear stage, it is proposed to superimpose on the travel of the control cable 16 for shifting from one gear stage to another a correction travel, by means of operative cooperation between the correction cam 13 and the pivoting cam 17 of the pivoting lever 15. In particular, the pivoting lever 15 is pivoted about the bearing point 5, which in turn changes the distance of the first cable deflection radius 18 relative to the drum 14. The shape of the correction cam 13 is selected so as to ensure that the travel of the control cable 16 for each gear stage has a correction or overshift travel (either an increase or a decrease from the travel required for gear shifting) while providing substantially identical or equal angles of rotation 51 for each gear stage. Also advantageous is the possibility of achieving larger angles of rotation 51 than is normally possible with the diameter of the drum 14. This means that, over the entire or a portion of the gear-shifting range, a step-up or a step-down can be achieved.

The design of a selector with the superimposition of a correction travel by means of a correction cam 13 is not restricted to the embodiment of FIG. 1. Indeed, there are other embodiments which comprises a correction cam for adding or superimposing correction travel to the travel of the control cable 16.

For example, FIG. 3 depicts another embodiment of a selector comprising a drum 23 rotatably connected to a rotary bushing 22, and a correction cam 27 rotationally fixedly connected to the drum 23. The correction cam 27 cooperates with a cam 28 attached to the housing 21. The drum 23 can be carried along by a lever 25 and a driver 26 which engages a slot guide 24 in the drum 23. When the rotary bushing 22 is rotated, in addition to the travel of the control cable 16, a correction travel is produced by the drum 23 as the central axis of the drum is displaced relative to a cable inlet 38 at the housing 21 and the rotary bushing 22, in a direction opposite to the pulling direction of the control cable 16.

FIG. 4 illustrates another embodiment of the inventive selector. As shown, the selector has a drum 30 and a pivoting lever 31 whose bearing point 33 has a pivot axis 34 extending substantially perpendicular to the central axis of the drum 30. The pivoting lever 31 has a pivoting cam 35 configured to engage a correction cam 36 and acts in the axial direction of the drum 30. The correction cam 36, like the drum 30, is connected to a rotary bushing (not illustrated here) and, when actuated, has the effect that that end of the pivoting lever 31 which is located opposite the pivoting cam 35, together with its deflection curve 32, is pivoted. In this manner, a correction travel with respect to a cable inlet 39 is superimposed on the travel of the control cable 16.

FIG. 5 illustrates still another embodiment of the inventive selector. As depicted, the selector has a rotary bushing 40 and a drum 41 connected to the rotary bushing 40. A correction cam 42 is arranged on either the drum 41 or the rotary bushing 40 and oriented for engagement in the radial direction of the drum 41 or rotary bushing 40 and cooperates with a cam 44 attached to or forming an integral portion of a pivoting lever 43. One end of the pivoting lever 43 is pivotably mounted at a pivot point 47 connected to a housing (not illustrated here). The other end of the pivoting lever 43 opposite the pivot point 47 rests against a cable inlet 45. The correction travel for the control cable 16 is thus brought about by movement of the cable inlet 45 as imparted by the pivoting lever 43.

Figure 6:
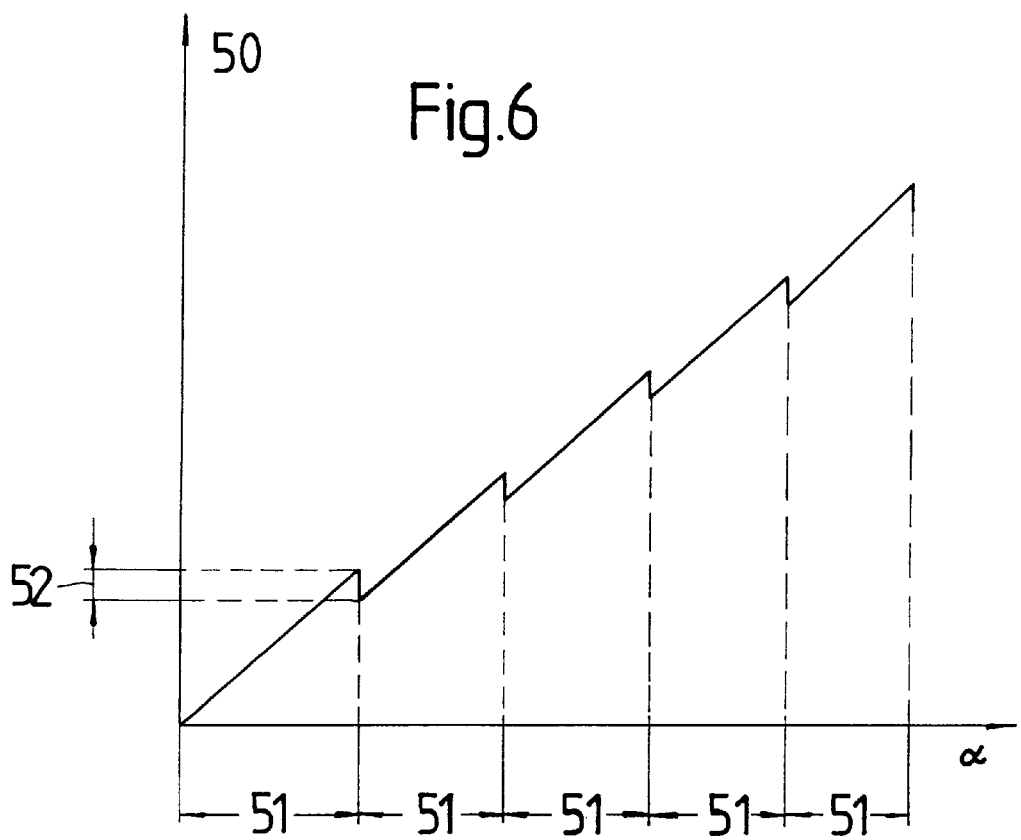
FIG. 6 graphically illustrates the profile of the resulting cable travel versus the angle of rotation.

FIG. 6 graphically illustrates the total or resultant travel 50 of the control cable 16 versus the angle of rotation α. Preferably, as illustrated, the result of the above-mentioned superimposition of the correction travel is a curve which approximately approaches a straight line. This curve has a toothed profile at each gear stage. The overshift travel is noted as 52. It is thus possible for each of the angles of rotation 51 to be approximately equal to each other for each gear stage.

It is contemplated that the profile need not be linear between individual gear stages. It is also contemplated that the magnitude of the overshift travel 52 may depend on the torque requirements on the selector and can, as already described above, also be of different magnitude from one gear stage to another gear stage.

Figure 7:
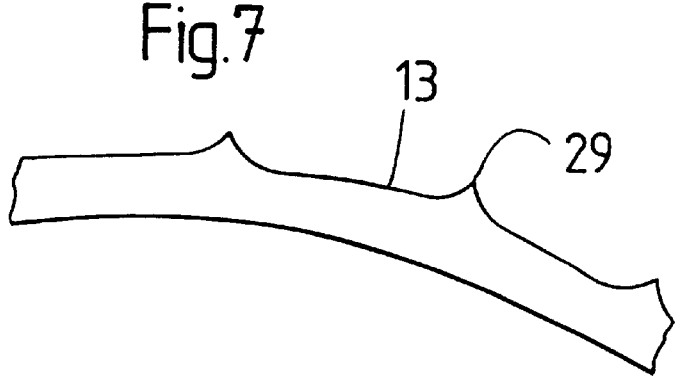
FIG. 7 shows the design of a correction cam with protrusions in order to achieve an overshift travel for each shift stage.

FIG. 7 is a partially sectioned view of another embodiment of a correction cam 13 having a plurality of radially outwardly extending projections or protrusions 29 in order to achieve the aforementional overshift travel automatically for individual shift stages. Each projection 29 preferably corresponds to a transition point between a first shift stage and a second shift stage. The projection 29 is shaped such that as a cooperating cam travels over the projection, an additional portion of the control cable is pulled directly into the housing 1 so as to produce the correction travel and is then released. The projection 29 may have a different shape, depending on the requirements of the bicycle gear mechanism for the correction travel.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A selector for a bicycle gear shifting mechanism for shifting a gear-driving chain between gear stages, the gear shifting mechanism being operatively connected to a control cable and actuatable through user-directed movement of the control cable, comprising:

a rotatable drum having a central axis and a circumferential wall for displacing the control cable helically wound thereon when said rotatable drum is rotated about the central axis;

means for selectively displacing said control cable through rotation of said rotatable drum from a first rotatable drum position associated with a first aligned position of the gear-driving chain aligned in a first gear stage to a second rotatable drum position associated with a second aligned position of the gear-driving chain aligned in a second gear stage so as to produce a cable travel which includes a correction travel for overshifting the gear-driving chain a distance beyond the second aligned position without moving the rotatable drum past the second rotatable drum position; and a housing, a pivoting lever pivotally supported at said housing for guiding the control cable, and a correction cam fixed with respect to rotation to said rotatable drum such that said correction cam rotates with said rotatable drum as said rotatable drum is rotated, said correction cam being configured to engage a portion of said pivoting lever for producing said correction travel as said rotatable drum is rotated, wherein the selector has a cable inlet for passing the control cable into the selector and said pivoting lever guides the control cable between the cable inlet and said rotatable drum, said pivoting lever having a pivoting configured to engage said correction cam.

2. The selector of claim 1, wherein said correction cam includes a radially outwardly extending projection corresponding to a transition point between one gear stage and another gear stage.

3. The selector of claim 2, wherein said projection is shaped such that as said portion of said pivoting lever travels over said projection, an additional portion of the control cable is pulled briefly into said housing to produce said correction travel and is then released.

4. The selector of claim 2, wherein said projection is shaped as a function of requirements of the bicycle gear shifting mechanism for said correction travel.

5. The selector of claim 1, further comprising a rotary bushing fixed with respect to rotation to said rotary drum such that said rotary bushing rotates with said rotatable drum as said rotatable drum is rotated, said means for selectively displacing said control cable being configured such that shifting of the gear-driving chain through successive gear changes can be accomplished by rotating said rotary bushing through successive angles of rotation, each of said successive angles of rotation being substantially equal to each other.

6. The selector of claim 1, wherein said housing further includes a bearing member, said pivoting lever having a bearing end pivotably mounted to said bearing member.

7. The selector of claims 1, wherein one end of said pivoting lever connects substantially coaxially with said cable inlet.

8. The selector of claim 1, wherein said means includes a correction cam configured to act in a radial direction of said rotatable drum.

9. A selector for a bicycle gear shifting mechanism for shifting a gear-driving chain between gear stages, the gear shifting mechanism being operatively connected to a control cable and actuatable through user-directed movement of the control cable, comprising:

a rotatable drum having a central axis and a circumferential wall for displacing the control cable helically wound thereon when said rotatable drum is rotated about the central axis;

means for selectively displacing said control cable through rotation of said rotatable drum from a first rotatable drum position associated with a first aligned position of the gear-driving chain aligned in a first gear stage to a second rotatable drum position associated with a second aligned position of the gear-driving chain aligned in a second gear stage so as to produce a cable travel which includes a correction travel for overshifting the gear-driving chain a distance beyond the second aligned position without moving the rotatable drum past the second rotatable drum position; and a housing, a pivoting lever pivotally supported at said housing for guiding the control cable, and a correction cam fixed with respect to rotation to said rotatable drum such that said correction cam rotates with said rotatable drum as said rotatable drum is rotated, said correction cam being configured to engage a portion of said pivoting lever for producing said correction travel as said rotatable drum is rotated, wherein said pivoting lever has a depression for guiding the control cable along a portion of said pivoting lever.

10. A selector for a bicycle gear shifting mechanism for shifting a gear-driving chain between gear stages, the gear shifting mechanism being operatively connected to a control cable and actuatable through user-directed movement of the control cable, comprising:

a rotatable drum having a central axis and a circumferential wall for displacing the control cable helically wound thereon when said rotatable drum is rotated about the central axis;

means for selectively displacing said control cable through rotation of said rotatable drum from a first rotatable drum position associated with a first aligned position of the gear-driving chain aligned in a first gear stage to a second rotatable drum position associated with a second aligned position of the gear-driving chain aligned in a second gear stage so as to produce a cable travel which includes a correction travel for overshifting the gear-driving chain a distance beyond the second aligned position without moving the rotatable drum past the second rotatable drum position; and a housing, a pivoting lever pivotally supported at said housing for guiding the control cable, and a correction cam fixed with respect to rotation to said rotatable drum such that said correction cam rotates with said rotatable drum as said rotatable drum is rotated, said correction cam being configured to engage a portion of said pivoting lever for producing said correction travel as said rotatable drum is rotated, wherein said pivoting lever is configured to have a first cable deflection radius for guiding the control cable in a direction tangential to said circumferential wall of said rotatable drum.

* * * * *